United States Patent [19]

Cameron

[11] 4,345,416
[45] Aug. 24, 1982

[54] VACUUM GRASS COLLECTING APPARATUS

[76] Inventor: George R. Cameron, 3616 Rexford La., Sarasota, Fla. 33583

[21] Appl. No.: 193,968

[22] Filed: Oct. 6, 1980

[51] Int. Cl.³ .................... A01D 35/26; A01D 35/22
[52] U.S. Cl. .................... 56/13.3; 56/16.6; 56/202
[58] Field of Search .............. 56/13.3, 12.8, 16.6, 56/202; 135/120, 155; 403/223

[56] References Cited

U.S. PATENT DOCUMENTS

| | | | |
|---|---|---|---|
| 2,920,435 | 1/1960 | Vallone | 56/13.3 |
| 2,926,477 | 3/1960 | Bebow | 56/16.6 |
| 2,955,403 | 10/1960 | McKee | 56/13.3 |
| 3,134,214 | 5/1964 | Shaw | 56/202 |
| 3,191,370 | 6/1965 | Epstein | 56/202 |
| 3,588,179 | 6/1971 | Gifford | 56/13.3 |
| 3,657,865 | 4/1972 | Ober | 56/16.6 |
| 3,757,503 | 9/1973 | Soldavini | 56/202 |
| 3,893,284 | 7/1975 | Thon et al. | 56/202 |
| 3,903,565 | 9/1975 | Hicks | 56/202 |
| 3,969,876 | 7/1976 | Turos | 56/202 |
| 3,999,316 | 12/1976 | Palmer | 56/202 |
| 4,095,398 | 6/1978 | Aumann et al. | 56/16.6 |
| 4,104,852 | 8/1978 | Tackett | 56/16.6 |
| 4,142,351 | 3/1979 | Neise et al. | 56/202 |
| 4,168,600 | 9/1979 | Klug et al. | 56/16.6 |
| 4,259,832 | 4/1981 | Du Ray | 56/202 |

Primary Examiner—Paul J. Hirsch
Attorney, Agent, or Firm—Benjamin P. Reese, II

[57] ABSTRACT

A vacuum grass collecting apparatus for a tractor-type lawnmower having a rear discharge opening in its cutting deck and a rear power-take-off. A refuse container and a blower are independently mounted on the rear of a tractor-type lawnmower. The blower consists essentially of a housing having an intake opening and a discharge opening, a rotatable drive shaft having a plurality of impeller blades mounted thereon and a support bearing for the rotatable drive shaft. An articulated duct is positioned under the rear axle of the tractor-type lawnmower and interconnects the rear discharge opening in the cutting deck and the intake opening in the housing of the blower. Another duct interconnects the discharge opening in the housing of the blower and an intake opening in the refuse container. The entire apparatus is positioned between the two imaginary parallel vertical planes which contain the outer extremities of the tractor-type lawnmower. With this apparatus, it is possible to mow close to buildings, flower beds, trees and similar obstacles with either side of the cutting deck of the lawnmower while continuously removing cut grass from the lawn.

4 Claims, 4 Drawing Figures

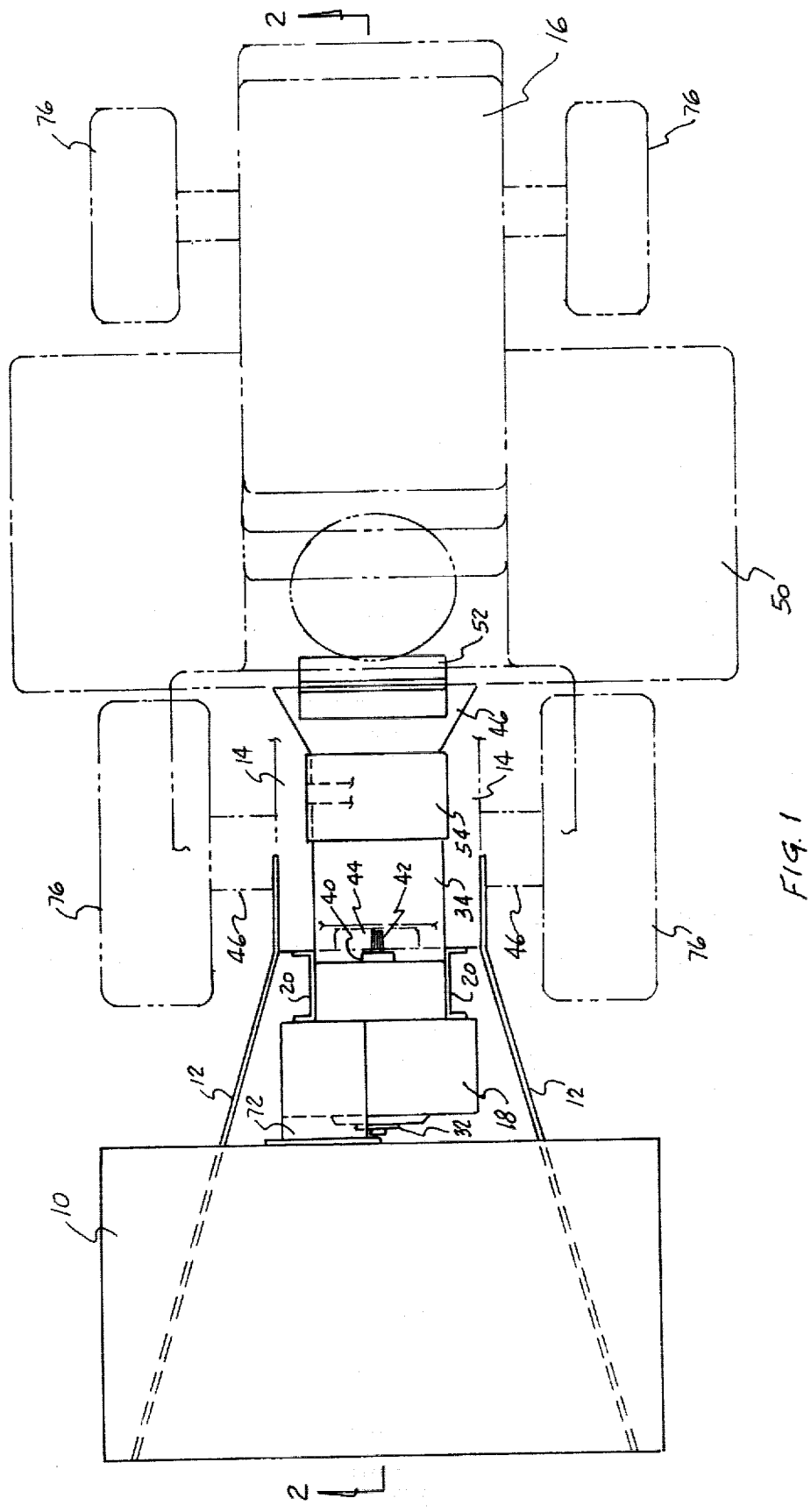

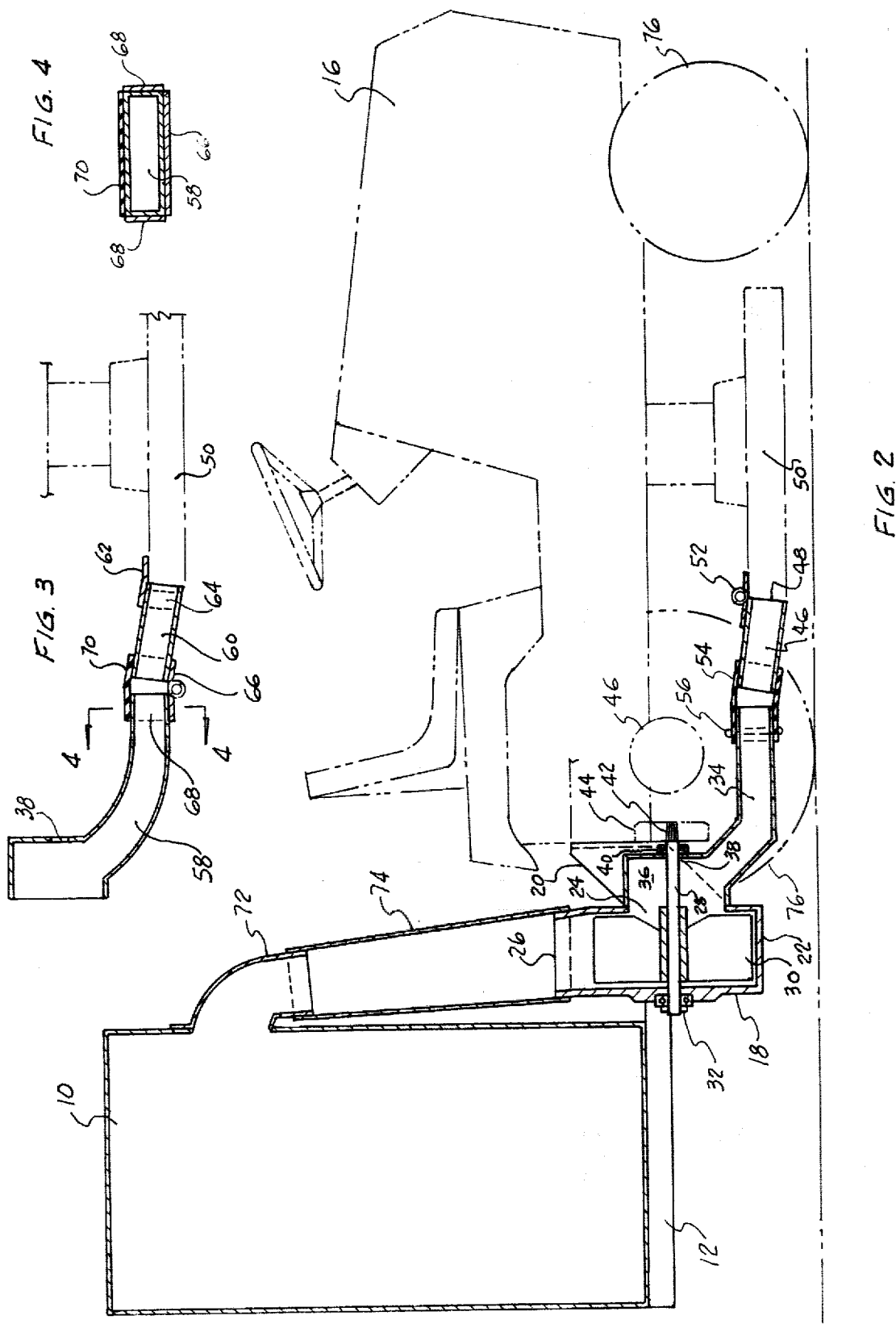

VACUUM GRASS COLLECTING APPARATUS

BACKGROUND OF THE INVENTION

This invention relates to a vacuum grass collecting apparatus for a tractor-type lawnmower having a rear discharge opening in its cutting deck and a rear power-take-off.

It is well known that cut grass, including grass clippings, cuttings and other debris produced by lawn mowing, must be removed from a lawn if a lawn which is both visually pleasing and healthy is desired. If cut grass is not removed, a heavy thatch will accumulate on the lawn. The accumulated thatch will smother new grass growth, provide a nesting place for destructive insects, and provide an environment conducive to rapid growth of mold, fungus and other lawn diseases.

Various methods and apparatus for removing cut grass from lawns are well known in the prior art. Relatively small lawns are usually mowed with non-riding lawnmowers. For such lawns, manually raking the lawn after it has been mowed is usually a satisfactory method for removing cut grass. Nevertheless, various apparatus for continuously removing cut grass while the lawn is being mowed with a conventional non-riding lawnmower are well known in the prior art.

Larger lawns are usually mowed with tractor-type lawnmowers. For such lawns, manually raking the lawn after it has been mowed is seldom a satisfactory method for removing cut grass. And, while rake attachments for tractor-type lawnmowers and other apparatus for removing cut grass after the lawn has been mowed are commercially available, apparatus for continuously removing cut grass while the lawn is being mowed with a tractor-type lawnmower are preferred for routine care of larger lawns.

Apparatus for continuously removing cut grass while the lawn is being mowed with a tractor-type lawnmower are well known in the prior art. One such apparatus consists essentially of a refuse container mounted on a small trailer which is pulled behind the tractor-type lawnmower and a duct vacuum transport system for conveying the cut grass from the discharge opening in the cutting deck of the lawnmower to the refuse container. The duct vacuum transport system includes a conventional blower which is powered by an auxiliary internal combustion engine. Unfortunately, that apparatus, and any other trailer mounted apparatus, is difficult to maneuver when mowing areas of the lawn adjacent to buildings, flower beds, trees and the like. Furthermore, the auxiliary internal combustion engine which is used to power the blower increases the complexity and cost of the apparatus.

It is desirable to have a relatively simple, inexpensive apparatus for continuously removing cut grass while the lawn is being mowed with a tractor-type lawnmower which does not restrict the maneuverability of the lawnmower. It is generally believed that such an apparatus should be mounted on the tractor-type lawnmower and various apparatus for mounting on such lawnmowers are well known in the prior art. Examples of typical prior art apparatus are disclosed in U.S. Pat. No. 4,095,398, for a "Grass Bagger", issued to Allman, et al., and U.S. Pat. No. 4,104,852, for a "Lawn Clipping Vacuum Collector", issued to Tackett. Each of those apparatus consists essentially of a refuse container mounted on the rear of the tractor-type lawnmower, a blower powered by the engine of the lawnmower, and a duct system for conveying cut grass from a side discharge opening in the cutting deck of the lawnmower to the refuse container. With each of those apparatus, the duct system extends a significant lateral distance beyond the side discharge opening in the cutting deck of the lawnmower. This increases the overall width of the tractor-type lawnmower without increasing its effective cutting width. And, while a tractor-type lawnmower using such an apparatus is easier to maneuver when mowing areas of the lawn adjacent to buildings, flower bed, trees and the like than a similar lawnmower using a trailer mounted apparatus, it is not possible to mow close to any such obstacle with the side of the lawnmower which has the discharge opening in the cutting deck.

U.S. Pat. No. 3,969,876, for a "Combination Mower and Catcher", issued to Turos, discloses a tractor-type lawnmower in combination with an apparatus for continuously removing cut grass while the lawn is being mowed. A duct system conveys cut grass from a rearwardly projecting discharge opening in one side of the cutting deck to a refuse container mounted on the rear of the lawnmower. With this apparatus, the duct system does not extend any significant lateral distance beyond the discharge opening. Accordingly, this apparatus does not restrict the maneuverability of the lawnmower when mowing areas of the lawn adjacent to buildings, flower beds, trees and the like. With this lawnmower and apparatus, it is possible to mow close to any such obstacle with either side of the lawnmower.

Unfortunately, the apparatus which is disclosed in U.S. Pat. No. 3,969,876 has several inherent disadvantages. First, the specific embodiment disclosed in that patent is a complex, specialized apparatus which is not readily adaptable for use with most tractor-type lawnmowers which are commercially available. Second, that apparatus does not have a blower or other suitable independent air pressure source to assist in conveying the cut grass through the duct system. With that apparatus, the sole source of air pressure which conveys the cut grass through the duct system is the air movement created by the rotation of the cutting blade in the housing of the cutting deck. Accordingly, that apparatus is not suitable for use with any tractor-type lawnmower which has a cutting deck with more than one cutting blade.

SUMMARY OF THE INVENTION

The present invention provides a vacuum grass collecting apparatus for a tractor-type lawnmower having a rear discharge opening in its cutting deck. The apparatus of the present invention is comprised of four major components, namely, a refuse container, a blower, a duct interconnecting the refuse container and the blower and an articulated duct interconnecting the blower and the rear discharge opening in the cutting deck of the tractor-type lawnmower. The blower is powered by a conventional power-take-off (PTO) located on the rear of the tractor-type lawnmower.

The refuse container and the blower are independently mounted on the rear of the tractor-type lawnmower. The blower consists essentially of a housing having an intake opening and a discharge opening, a rotatable drive shaft having a plurality of impeller blades mounted thereon and a support bearing for the rotatable drive shaft. One end of the duct which interconnects the refuse container and the blower engages an intake opening in the refuse container and the other end of that duct engages the discharge opening in the housing of the blower. One end of the articulated duct which interconnects the blower and the rear discharge opening in the cutting deck of the tractor-type lawnmower engages the intake opening in the housing of the blower and the rear discharge opening in the cutting deck of the lawnmower. In the preferred embodiment, the articulated duct runs under the rear axle of the tractor-type lawnmower and has a geometrical configuration which provides adequate ground clearance while maintaining a cross-sectional area which is sufficient for efficient operation of the apparatus. Preferably, the articulated duct has either an oval or an essentially rectangular cross-section.

The apparatus of the present invention does not restrict the maneuverability of a tractor-type lawnmower when mowing areas of the lawn adjacent to buildings, flower beds, trees and the like. With the apparatus of the present invention, it is possible to mow close to such obstacles with either side of the cutting deck of the lawnmower while continuously removing cut grass from the lawn. This is possible because no portion of the apparatus extends beyond either of the two imaginary parallel vertical planes which contain the lateral extremities of the tractor-type lawnmower, exclusive of its cutting deck.

The apparatus of the present invention is readily adaptable for use with many tractor-type lawnmowers which are commercially available. The apparatus is suitable for use with a tractor-type lawnmower having a cutting deck with either a single cutting blade or a plurality of cutting blades.

These and many more advantages, features and objects of the present invention will be apparent from the following brief description of drawings, description of the preferred embodiment and claims.

BRIEF DESCRIPTION OF THE DRAWINGS

FIG. 1 is a top view of the vacuum grass collecting apparatus of the present invention mounted on a tractor-type lawnmower shown in phantom.

FIG. 2 is a sectional view taken along Line 2—2 of FIG. 1 further illustrating the configuration of the articulated duct which interconnects the blower of the apparatus and the rear discharge opening in the cutting deck of the tractor-type lawnmower.

FIG. 3 is a side view, in section, of another suitable articulated duct for interconnecting the blower of the apparatus and the rear discharge opening in the cutting deck of the tractor-type lawnmower.

FIG. 4 is a sectional view taken along Line 4—4 of FIG. 3.

DESCRIPTION OF THE PREFERRED EMBODIMENT

The preferred embodiment of the vacuum grass collecting apparatus of the present invention is illustrated in FIGS. 1, 2, 3 and 4. A top view of the apparatus is presented in FIG. 1. A sectional view of the apparatus taken along Line 2—2 of FIG. 1 is presented in FIG. 2. Sectional views of one type of articulated duct suitable for use with the apparatus are presented in FIGS. 3 and 4. As illustrated in FIGS. 1 and 2, the apparatus is mounted on a tractor-type lawnmower having a rear discharge opening in its cutting deck.

Referring to FIGS. 1 and 2, a refuse container 10 is mounted on the rear of a conventional tractor-type lawnmower. As illustrated, the refuse container 10 is a rectangular metal bin or box having a pair of rear opening doors. The refuse container 10 rests on a pair of support brackets 12 fastened to the frame 14 of the tractor-type lawnmower 16. Various conventional fastening means can be used to secure the bottom of the refuse container 10 to the support brackets 12 and the support brackets 12 to the sides of the frame 14. However, conventional threaded bolts which engage threaded nuts are preferred to facilitate removal of the refuse container 10. Of course, other conventional refuse containers, such as a cloth bag or a disposable plastic bag in combination with a suitable support frame, can be substituted for the refuse container 10 which is illustrated in FIGS. 1 and 2.

A blower 18 is mounted on the rear of the tractor-type lawnmower 16 in the space circumscribed by the rear of the frame 14, the support brackets 12 and the front of the refuse container 10. A pair of mounting brackets 20 interconnect the blower 18 and the frame 14 of the tractor-type lawnmower 16. Various conventional fastening means can be used to secure the housing of the blower 18 to the mounting brackets 20 and the mounting brackets 20 to the rear of the frame 14. However, conventional threaded bolts which engage threaded nuts are preferred to facilitate removal of the blower 18. The blower 18 consists essentially of a housing 22 having an intake opening 24 and a discharge opening 26, a rotatable drive shaft 28 having a plurality of impeller blades 30 mounted thereon and a support bearing 32 for the rotatable drive shaft.

An articulated duct interconnects the blower 18 and the rear discharge opening in the cutting deck of the tractor-type lawnmower 16. To form the articulated duct, one end of a first duct element 34 is positioned in the space circumscribed by the rear of the frame 14, the mounting brackets 20 and the front of the blower 18 to engage the intake opening 24 in the housing 22 of the blower 18. The duct element 34 is secured to the housing 22 by conventional means, such as threaded bolts which engage threaded nuts, to achieve a reasonably airtight seal. At this location, the duct element 34 has a generally rectangular configuration which circumscribes an essentially rectangular intake plenum 36 adjacent to the impeller blades 30 of the blower 18. In contrast to prior art apparatus, the blower 18 is mounted such that the longitudinal axis of its drive shaft 28 is parallel to the longitudinal axis of the tractor-type lawnmower 16. The rear end of the drive shaft 28 is supported for rotation by the support bearing 32 located external to the rear of the housing 22. The drive shaft 28 extends forward through the intake opening 24 in the housing 22, the plenum 36, and a cylindrical opening 38 through the wall of the duct element 34. A conventional felt or rubber gasket 40 is provided to seal the cylindrical opening 38.

As illustrated in FIGS. 1 and 2, the front end of the drive shaft 28 has a splined portion 42 which engages the independently controlled, splined power-take-off (PTO) 44 located at the rear of the tractor-type lawnmower 16. In this manner, the PTO 44 of the tractor-type lawnmower 16 rotates the drive shaft 28 for operation of the apparatus. Of course, other conventional coupling means, such as a square drive coupling, a universal joint coupling or a flexible drive coupling, can be used to operatively connect the drive shaft 28 of the blower 18 and the PTO 44 located at the rear of the tractor-type lawnmower 16. In the preferred embodiment, the bearing of the PTO functions as the front support bearing for the drive shaft 28. Nevertheless, with some tractor-type lawnmowers, it may be desirable to provide an independent front support bearing for the drive shaft 28.

The first duct element 34 extends downward and forward from the plenum 36 and turns for a horizontal run forward under the rear axle 46 of the tractor-type lawnmower 16. One end of a second duct element 46 engages the rear discharge opening 48 in the cutting deck 50 of the tractor-type lawnmower 16. As illustrated in FIGS. 1 and 2, the duct element 46 is attached to the cutting deck 50 by a pair of conventional hinge assemblies 52 which bridge the top surfaces of the duct element 46 and the cutting deck 50. Preferably, each of the hinge assemblies 52 is of the type which permits removal of the hinge bolt. In such case, the duct element 46 can be easily removed from the cutting deck 50. While the first duct element 34 and the second duct element 46 which are illustrated in FIGS. 1 and 2 have an essentially rectangular cross-section, duct elements having an oval cross-section are also suitable for use as elements of the articulated duct. In fact, it will be readily appreciated that any cross-sectional configuration which provides an articulated duct having adequate ground clearance and a cross-sectional area which is sufficient for efficient operation of the apparatus can be utilized.

To complete the flow path between the rear discharge opening 48 in the cutting deck 50 and the intake opening 24 in the housing 22 of the blower 18, the free ends of the first duct element 34 and the second duct element 46 are connected in a manner which accommodates the vertical and torsional movement of the cutting deck 50 which occurs during normal operation of the tractor-type lawnmower 16. As illustrated in FIGS. 1 and 2, this can be accomplished by attaching one end of an essentially rectangular rubber grommet 54 to the free end of the duct element 46 by conventional means, such as bolting or cementing. With this connecting means, the other end of the rubber grommet 54 is fitted around the free end of the duct element 34 and secured with a conventional clamp. Of course, the rubber grommet 54 could be secured to the free end of the duct element 34 by other conventional means. It will also be readily appreciated that other flexible materials could be substituted for the rubber grommet 54 to create an articulated joint between the first duct element 34 and the second duct element 46 in the general manner illustrated in FIGS. 1 and 2.

The articulated duct can be formed from various elements and by various means other than the elements and means illustrated in FIGS. 1 and 2 without departing from the spirit and scope of the invention. For example, FIG. 3 illustrates an articulated duct having a first duct element 58 which is essentially identical to the first duct element 34 illustrated in FIGS. 1 and 2. But, the second duct element 60 illustrated in FIG. 3 differs substantially from the second duct element 46 illustrated in FIGS. 1 and 2. The second duct element 60 is not attached to the cutting deck 50 as is the case with the second duct element 46. Instead, the duct element 60 is provided with a flat plate 62 attached to its top above its front opening by conventional means, such as welding, which rests on the top of the cutting deck 50 above its rear discharge opening. A rubber flap 64 is attached to each side of the front opening of the duct element 60 by conventional means, such as bolting or cementing. These rubber flaps 64 slideably engage the sides of the rear discharge opening 48 in the cutting deck 50 to partially seal any gap which would otherwise exist at that location.

The articulated joint between the first duct element 58 and the second duct element 60 illustrated in FIG. 3 differs substantially from the articulated joint between similar elements as illustrated in FIGS. 1 and 2. Yet, its ultimate function, i.e. permitting movement between the duct elements to accommodate movement of the cutting deck 50 during normal operation of the tractor-type lawnmower 16, is identical. As illustrated in FIG. 3, a conventional hinge assembly 66 bridges the bottom surfaces of the first duct element 58 and the second duct element 60. The duct element 60 has a rearwardly extending plate 68 attached to each side of its rear opening. These plates 68 slideably engage the outside surfaces of the sides of the duct element 58 adjacent to its front opening to partially seal any gap which would otherwise exist at this location. The plates 68 can be attached to the duct element 60 by conventional means, such as welding, or the duct element 60 can be cut to achieve the desired configuration. A flexible rubber strip 70 bridges the top surfaces of the first duct element 58 and the second duct element 60 to seal any gap which would otherwise exist at that location.

It will be readily appreciated that a single flexible tube having an appropriate cross-sectional configuration could be substituted for the combinations of structural elements which have been described and illustrated to form an articulated duct for interconnecting the blower 18 and the rear discharge opening 48 in the cutting deck 50. But, flexible tubes having an appropriate cross-sectional configuration are not readily available in the commercial marketplace. Furthermore, even if such tubes were readily available, it is believed that the resulting articulated duct would have physical strength and wear characteristics which are inferior to those which are inherent in an articulated duct which is fabricated from steel or another suitable metal alloy. Accordingly, an articulated duct, identical to or similar to one of the combinations of structural elements described and illustrated herein, fabricated from steel or another suitable metal alloy is preferred.

Returning to FIGS. 1 and 2, the refuse container 10 is provided with an intake opening 72 in its front surface. Preferably, the intake opening 72 is located near the top of the refuse container 10. To complete the flow path between the blower 18 and the refuse container 10, a duct 74 interconnects the discharge opening 26 in the housing 22 of the blower 18 and the intake opening 72 in the front surface of the refuse container 10. Because the duct 74 is not located in a position where clearance is an issue, its cross-sectional configuration is not critical. Furthermore, the duct 74 can be either rigid or flexible, as desired.

During operation of the apparatus, the PTO 44 rotates the drive shaft 28 of the blower 18. As the drive shaft 28 rotates, the rotating impeller blades 30 draw air through the intake opening 24 in the housing 22 and discharge that air through the discharge opening 26. This creates negative air pressure in the articulated duct and positive air pressure in the duct 72. As the lawn is being mowed with the tractor-type lawnmower 16, cut grass is continuously discharged through the rear discharge opening 48 in the cutting deck 50 into the articulated duct. And, the negative air pressure continuously conveys the cut grass through the articulated duct. The cut grass enters the plenum 36 for subsequent entry into the housing 22 of the blower 18 through the intake opening 24. The cut grass is continuously discharged through the discharge opening 26 of the housing 22 into the duct 74. Following such discharge, the positive air pressure in the duct 74 continously conveys the cut grass to the refuse container 10. The cut grass enters the refuse container 10 through the intake opening 72 and falls to the bottom of the refuse container 10. When the cut grass in the refuse container 10 accumulates to the height of the intake opening 72, operation of the apparatus is discontinued and the cut grass is removed from the refuse container 10 for appropriate disposal.

Referring to FIG. 1, it will be readily appreciated that the apparatus of the present invention does not restrict the maneuverability of the tractor-type lawnmower 16. With the apparatus of the present invention, it is possible to mow close to buildings, flower beds, trees and other obstacles with either side of the cutting deck 50 while continuously removing cut grass from the lawn. This is possible because no portion of the apparatus extends beyond either of the two imaginary parallel vertical planes which contain the lateral extremities of the tractor-type lawnmower 16, exclusive of its cutting deck 50. With most of the tractor-type lawnmowers which are commercially available, the outer lateral extremities of the tires 76 are the lateral extremities of the tractor-type lawnmower 16, exclusive of its cutting deck 50. And, while it is desirable to use a cutting deck 50 which extends substantially beyond the outer lateral extremities of the tires 76, as illustrated in FIG. 1 it is sufficient that the cutting deck 50 extend laterally to the outer lateral extremities of the tires 76 to achieve the benefits which are inherent in the apparatus of the present invention when mowing areas of the lawn adjacent to buildings, flower beds, trees and the like. The apparatus of the present invention can be used with a tractor-type lawnmower having a cutting deck with either a single cutting blade or a plurality of cutting blades.

While the present invention has been disclosed in connection with the preferred embodiment thereof, it should be understood that there may be other embodiments which fall within the spirit and scope of the invention as defined by the following claims.

I claim:

1. A vacuum grass collecting apparatus for a tractor-type lawnmower having a rear discharge opening in its cutting deck and a rear power-take-off, comprising:
   (a) a refuse container having an intake opening;
   (b) means for mounting said refuse container on the rear of the tractor-type lawnmower;
   (c) a blower consisting essentially of a housing having an intake opening and a discharge opening, a rotatable drive shaft having a plurality of impeller blades mounted thereon and a support bearing for said rotatable drive shaft;
   (d) means for mounting said blower on the rear of the tractor-type lawnmower;
   (e) a duct interconnecting said intake opening in said refuse container and said discharge opening in said housing of said blower;
   (f) an articulated duct, positioned under the rear axle of the tractor-type lawnmower, interconnecting said intake opening in said housing of said blower and the rear discharge opening in the cutting deck of the tractor-type lawnmower, said articulated duct comprising a first duct element which engages said intake opening in said housing of said blower, a second duct element which engages the rear discharge opening in the cutting deck of the tractor-type lawnmower, a hinge assembly which bridges the bottom surfaces of said first duct element and said second duct element, a pair of rearwardly extending plates fixedly attached to the sides of the rear opening of said second duct element to slideably engage the outside surfaces of the sides of said first duct element adjacent to its front opening, and a flexible rubber strip which bridges the top surfaces of said first duct element and said second duct element; and
   (g) means for operatively connecting said rotatable drive shaft of said blower and the rear power-take-off of the tractor-type lawnmower; said refuse container, said means for mounting said refuse container, said blower, said means for mounting said blower, said ducts, and said means for operatively connecting said rotatable drive shaft and the rear power-take-off, all being positioned between the two imaginary parallel vertical planes which contain the outer extremities of the tractor-type lawnmower, exclusive of its cutting deck.

2. A vacuum grass collecting apparatus for a tractor-type lawnmower having a rear discharge opening in its cutting deck and a rear power-take-off, comprising:
   (a) a refuse container having an intake opening;
   (b) means for mounting said refuse container on the rear of the tractor-type lawnmower;
   (c) a blower consisting essentially of a housing having an intake opening and a discharge opening, a rotatable drive shaft having a plurality of impeller blades mounted thereon and a support bearing for said rotatable drive shaft;
   (d) means for mounting said blower on the rear of the tractor-type lawnmower;
   (e) a duct interconnecting said intake opening in said refuse container and said discharge opening in said housing of said blower;
   (f) an articulated duct, positioned under the rear axle of the tractor-type lawnmower, interconnecting said intake opening in said housing of said blower and the rear discharge opening in the cutting deck of the tractor-type lawnmower, said articulated duct comprising a first duct element which engages said intake opening in said housing of said blower, a second duct element which engages the rear discharge opening in the cutting deck of the tractor-type lawnmower, a hinge assembly which bridges the bottom surfaces of said first duct element and said second duct element, a pair of rearwardly extending plates fixedly attached to the sides of the rear opening of said second duct element to slideably engage the outside surfaces of the sides of said first duct element adjacent to its front opening, and a flexible rubber strip which bridges the top surfaces of said first duct element and said second duct element; and
   (g) means for operatively connecting said rotatable drive shaft of said blower and the rear power-take-off of the tractor-type lawnmower.

3. A vacuum grass collecting apparatus for a tractor-type lawnmower having a rear discharge opening in its cutting deck and a rear power-take-off, comprising:
   (a) a refuse container having an intake opening;
   (b) means for mounting said refuse container on the rear of the tractor-type lawnmower;

(c) a blower consisting essentially of a housing having an intake opening and a discharge opening, a rotatable drive shaft having a plurality of impeller blades mounted thereon and a support bearing for said rotatable drive shaft;

(d) means for mounting said blower on the rear of the tractor-type lawnmower;

(e) a duct interconnecting said intake opening in said refuse container and said discharge opening in said housing of said blower;

(f) an articulated duct, positioned under the rear axile of the tractor-type lawnmower, interconnecting said intake opening in said housing of said blower and the rear discharge opening in the cutting deck of the tractor-type lawnmower, said articulated duct comprising a first duct element which engages said intake opening in, and is fixedly attached to, said housing of said blower, a second duct element having a forwardly extending plate fixedly attached to the top of its front opening to rest on the top surface of the cutting deck of the tractor-type lawnmower, a pair of forwardly extending rubber flaps fixedly attached to the sides of its front opening to slideably engage the outside surfaces of the sides of the rear discharge opening in the cutting deck of the tractor-type lawnmower, and a pair of rearwardly extending plates fixedly attached to the sides of said first duct element adjacent to its front opening, a hinge assembly which bridges the bottom surfaces of said first duct element and said second duct element, and a flexible rubber strip which bridges the top surfces of said first duct element and said second duct element; and (g) means for operatively connecting said rotatable drive shaft of said blower and the rear power-take-off of the tractor-type lawnmower; said refuse container, said means for mounting said refuse container, said blower, said means for mounting said blower, said ducts, and said means for operatively connecting said rotatble drive shaft and the rear power-take-off, all being positioned between the two imaginary parallel vertical planes which contain the outer extremities of the tractor-type lawnmover, exclusive of its cutting deck.

4. A vacuum grass collecting apparatus for a tractor-type lawnmower having a rear discharge opening in its cutting deck and a rear power-take-off, comprising:

(a) a refuse container having an intake opening:

(b) means for mouting said refuse container on the rear of the tractor-type lawnmower;

(c) a blower consisting essentially of a housing having an intake opening and a discharge opening, a rotatable drive shaft having a plurality of impeller blades mounted thereon and a support bearing for said rotatable drive shaft;

(d) means for mounting said blower on the rear of the tractor-type lawnmower;

(e) a duct interconnecting said intake opening in said refuse container and said discharge opening in said housing of said blower;

(f) an articulated duct, positioned under the rear axle of the tractor-type lawnmower, interconnecting said intake opening in said housing of said blower and the rear discharge opening in the cutting deck of the tractor-type lawnmower, said articulated duct comprising a first duct element which engages said intake opening in, and is fixedly attached to, said housing of said blower, a second duct element having a forwardly extending plate fixedly attached to the top of its front opening to rest on the top surface of the cutting deck of the tractor-type lawnmower, a pair of forwardly extending rubber flaps fixedly attached to the sides of its front opening to slideably engage the outside surfaces of the sides of the rear discharge opening in the cutting deck of the tractor-type lawnmower, and a pair of rearwardly extending plates fixedly attached to the sides of its rear opening to slideably engage the outside surfaces of the sides of said first duct element adjacent to its front opening, a hinge assembly which brigdes the bottom surfaces of said first duct element and said second duct element, and a flexible rubber strip which bridges the top surfaces of said first duct element and said second duct element; and (g) means for operatively connecting said rotatable drive shaft of said blower and the rear power-take-off of the tractor-type lawnmower.

* * * * *